Aug. 14, 1956 E. KOHRING 2,758,428
SWIVEL WHEEL HEAD FOR GRINDING MACHINE
Filed June 4, 1954
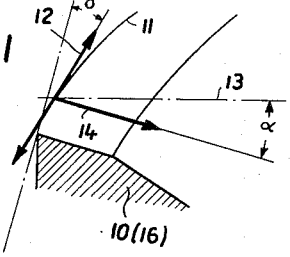
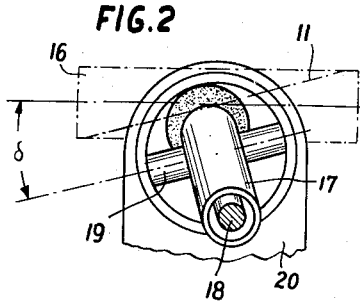
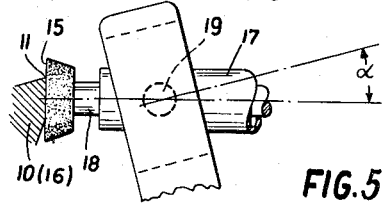
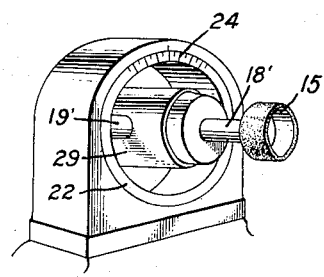
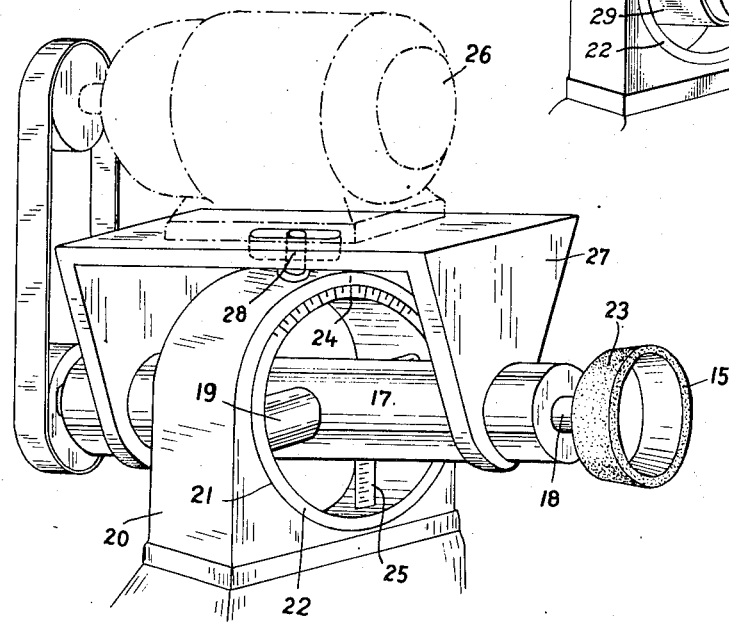
INVENTOR.
Erwin Kohring
BY Richard Low
Ag't

United States Patent Office 2,758,428
Patented Aug. 14, 1956

2,758,428

SWIVEL WHEEL HEAD FOR GRINDING MACHINE

Erwin Kohring, Koln-Deutz, Germany, assignor to Alfred H. Schutte, Koln-Deutz, Germany, a company of Germany Application June 4, 1954, Serial No. 434,490

Claims priority, application Germany July 9, 1953

7 Claims. (Cl. 51—166)

This invention relates to a swivel wheel head for grinding machines, and more particularly to such a swivel wheel head for grinding the clearance of cutting tools, especially helical milling cutters.

In spiral cutters, for instance, spiral plain milling cutters, each cutting plane constitutes a helical surface. The effective cutting angle is measured at right angles to the cutting edge, that is, in the perpendicular plane, since the chips, during milling, run off in this direction. When measured in the frontal plane of the tool, the angle of the clearance surface is smaller than the actual clearance which, too, is measured in the perpendicular plane as is the cutting angle. The difference in any individual case depends on the helix angle of the tool.

Perfectly ground cutting angles are absolutely necessary if tools are to operate at maximum efficiency. There are tables available from which one may determine the clearance necessary in the frontal plane of the tool to ensure the actual clearance in the perpendicular plane. The angle in the frontal plane is frequently used as an indication for the setting of the axis of the grinding wheel spindle if the frontal face of a cup wheel is used for grinding. There are two possible ways of setting the spindle axis. With machines having a grinding wheel spindle that can be tilted in a vertical plane, the tooth rest is at the same level as the tool axis. The wheel spindle is tilted through the desired angle. With machines which do not permit tilting of the wheel spindle in a vertical plane, the level of the tooth rest must be set so as to achieve the same effect. In the latter case, the angle is formed by the horizontal plane, and the line connecting the point of support of the tooth rest and the axis of the tool. With these known methods of setting, it is necessary that the center of the frontal surface of the cup wheel be at the same level as the area ground on the tool. The direction of grinding which can be seen from the grinding marks on the tool must be in the frontal plane of the tool since it was the clearance in the frontal plane that was used for the setting. One may as well set another angle if the direction of grinding on the tool is changed accordingly.

One object of my present invention is to provide a device which will ensure the correct clearance in every case and independent from the direction of grinding.

The idea underlying this invention is based on my discovery that the grinding surface of a cup-shaped grinding wheel must lie in a certain plane to achieve the referred to object. This plane is determined as follows:

The clearance surface of a spiral milling cutter follows a curved helical plane. The tangential plane touching the clearance surface in any one point of the cutting edge is defined by the tangent to the helical edge and by a line perpendicular to that tangent, which line is considered swung in the perpendicular plane through the clearance angle. The frontal face of the grinding wheel must be brought into this plane. For this purpose it is necessary that the grinding wheel spindle be adjustable in all directions, that is, to allow settings according to the helix angle of the cutting edge as well as in accordance with the clearance angle. It is desired to avoid the use of conversion tables or diagrams in order to eliminate the possibility of mistakes.

An important object of the present invention is to provide a swivel head for grinding machines, which will make it possible to set all necessary angles, that is, the helix angle and the clearance, directly on dials without any intermediate calculations.

To the accomplishment of the foregoing and other objects which will appear hereinafter, my invention consists in a swivel wheel head for grinding machine, in the elements thereof, and in the relation of these elements one to the other, as are more particularly described in the specification and sought to be defined in the claims.

The specification is accompanied by a drawing in which:

Fig. 1 is explanatory of the way of measuring the clearance;

Fig. 2 illustrates the setting of a swivel wheel head for grinding machine, according to this invention, to conform to the inclination of the cutting edge of a milling cutter;

Fig. 3 illustrates the setting of the apparatus of the invention to conform to the clearance;

Fig. 4 is a perspective view of the apparatus; and

Fig. 5 is a perspective view of a modified apparatus.

Referring to the drawing in greater detail, and initially to Fig. 1, a cutting tooth 10 of a spiral plain milling cutter has a helical cutting edge 11. The tangential plane in any point of the cutting edge is defined by the lines 12 and 13 which intersect at right angles. The line 12 is the tangent to the cutting edge 11 having the helix angle δ. The line 13 intersects with the line 12, as has been stated, at right angles and forms a tangent to the circumference of the perpendicular plane of the cylindrical cutter. The desired clearance behind the cutting edge is designated α. The clearance at any point of the edge 11 is defined by the line 13 and the line 14, the latter extending at right angles to the line 12. The line 14 is swung out of the plane 12, 13 toward the axis of the tool through the angle α. The clearance surface of the cutting edge 11 forms a helically curved plane.

To permit proper spatial adjustment of the wheel spindle, the bearing sleeve 17 of the wheel spindle 18 is rotatable around the longitudinal axis of the latter so that the trunnion 19 can be brought into a position parallel to the tangent to the cutting edge 11 (see Fig. 2). Subsequently, the wheel spindle 18, as shown in Fig. 3, is swung through the clearance angle about the trunnions 19.

A swivel wheel head for grinding machines, in accordance with my invention, may, for example, be built as shown in Fig. 4. A bearing housing 20 has an opening 21 in which a ring 22 is rotatable. Within this ring, the bearing sleeve 17 is swingingly supported by the trunnions 19.

For setting the cup wheel 23, using the free rim 15 as the grinding surface, the ring 22 is set to the helix angle δ of the milling cutter 16 with the aid of the graduation in degrees 24. This causes the trunnions 19 to assume a position parallel to the cutting edge 11. Then the bearing sleeve 17 is swung about the bar 19 by the desired clearance angle α which can be read from the graduation 25.

The wheel spindle is driven by the motor 26 which is supported by a bracket 27 supported, in turn, by the bearing sleeve 17. The bracket 27 does not follow the rotary movement of the sleeve 17, but is prevented therefrom by a bolt 28 which registers with a corresponding recess. On the other hand, the bracket 27 and motor 26 follow the swinging or swiveling movement of the sleeve 17 about the cross bar 19. The clearances set in this manner are relatively small so that the shift in the location of the center of gravity of the system 17, 27, 26 is small.

It is practically possible to avoid any shift in the center of gravity if the motor is supported by means of cross bars within the ring 22 so that the motor shaft at the same time forms the wheel spindle. In Fig. 5, the motor housing 29 is shown to be supported within the ring 22 by means of trunnions 19'. The motor shaft 18' constitutes also the wheel spindle.

It is believed that the construction and operation of the form of apparatus for practicing the invention, shown in the drawing and described hereinbefore, and the many advantages thereof, will be fully understood. Some of the features and advantages of the invention are reviewed hereinafter.

The grinding wheel spindle in the apparatus of my invention is adapted to be swung through the clearance angle, the axis of rotation being preferably in a vertical plane which is parallel to the line generating the tool surface by rotation, and also to the tool axis in the case of cylindrical tools. The angle of inclination of the axis of rotation in that vertical plane corresponds to the helix angle of the tool. Obviously, it is immaterial in which order the two settings of the invention are made.

In a known grinding machine, special importance has been attached to a grinding direction at right angles to the cutting edge. In that known device, all settings are carried out about the point of contact of the supporting finger with the tool. Aside from the two settings for the clearance and the helix angle, a third setting for the diameter of the grinding wheel was required.

My invention is based on the discovery that correct grinding is always assured if the grinding surface is located in a plane which according to Fig. 1 is defined by the lines 12 and 14. It is then without significance which direction of grinding is maintained. Slightly hollow grinding which may occur is also insignificant since there is the correct angle at the cutting edge in any case.

To make the setting of the grinding wheel spindle in all directions possible, the sleeve in which the spindle rotates is preferably supported in a ring by means of a cross bar for swinging motions about said bar. This ring is rotatable within a bearing housing. The ring and housing are preferably graduated in degrees for adjustments of the ring to the helix angle of the tool, which angle is usually indicated on the frontal surface of the tool. I further prefer to provide another graduation in degrees to allow inclination-setting of the wheel spindle in relation to the ring and to set the desired clearance on the latter graduation.

In a preferred embodiment of the invention, the spindle-bearing sleeve is supported in the ring by a cross bar which is provided at the midpoint of the sleeve. The driving motor is then carried by a bracket, supported by the sleeve, approximately in a labile equilibrium. Due to the relatively small clearance angle, the center of gravity of the entire moving system shifts only very slightly. The forces created by the eccentric location of the center of gravity are so small that they can readily be absorbed by the usual fastening means. With devices of known constructions, adjustments frequently cause substantial shifts of the center of gravity, which fact is a ready cause for breakdowns.

Essential advantages of the grinding machine of the invention, apart from the direct settings for the clearance and helix angles, consist in the simplicity of construction and in the fact that virtually any point of the grinding surface can be used for the grinding of the clearance of the tool. It is, therefore, unnecessary that the direction of grinding be at right angles to the cutting edge. In spite of the simple construction according to the invention and in spite of the easy adjustability, the center of gravity of the swiveling system remains, as has already been indicated, practically constant with any setting.

It will be apparent that while I have shown and described my invention in a few forms only, many changes and modifications may be made without departing from the spirit of the invention defined in the following claims.

I claim:

1. A grinding machine for grinding the clearance of helical milling cutters; said grinding machine comprising a cup-shaped grinding wheel having an annular grinding surface at the rim thereof, a rotatable wheel spindle supporting said cup-shaped grinding wheel, means supporting said spindle and defining a swinging axis for the latter, which axis is disposed outside of said grinding surface of said cup-shaped grinding wheel and lies within a plane parallel to the generatrix of said annular grinding surface, the spindle being adapted to be swung about said axis and to be set at the desired clearance angle, and means rotatably supporting said axis-defining means, the latter being thus adapted to be set within said plane to the amount of the helix angle of the helical milling cutter to be ground.

2. A grinding machine for grinding the clearance of helical milling cutters; said grinding machine comprising a cup-shaped grinding wheel having a grinding surface on the rim thereof, a rotatable spindle having said cup-shaped grinding wheel on an end thereof with the axis of said wheel aligned with the axis of rotation of said spindle, first means supporting said spindle for swinging about an axis which is spaced from said grinding surface of the cup-shaped grinding wheel and which extends through the axis of rotation of the spindle, the latter being adapted to be swung about its swinging axis to be set at the necessary clearance angle, and second means supporting said first means for rotation of the latter within a plane extending through said swinging axis of the spindle, said swinging axis being adapted to be set, within said plane, to the amount of the helix angle of a helical milling cutter to be ground.

3. A grinding machine according to claim 2; wherein said first supporting means includes a sleeve in which said spindle is journalled, a ring extending around said sleeve, and diametrically opposed trunnions extending from said sleeve and pivotally mounted in said ring to define said swinging axis of the spindle; and wherein said second supporting means includes an apertured bearing housing in which said ring is rotatably disposed with said trunnions lying in the plane of rotation of said ring.

4. A grinding machine according to claim 3; wherein said ring and housing have cooperating graduations thereon for directly indicating in degrees the helix angle of a helical milling cutter to be ground corresponding to the rotational position of said ring with respect to said housing.

5. A grinding machine according to claim 3; wherein said sleeve and ring having cooperating graduations thereon for directly indicating in degrees the clearance angle of a helical milling cutter to be ground corresponding to the inclination of the axis of rotation of said spindle relative to the plane of rotation of said ring.

6. A grinding machine according to claim 3; further comprising a motor for driving said spindle, and a bracket mounting said motor on said sleeve, said trunnions defining the swinging axis of the spindle being arranged substantially at the center of said sleeve so that the motor is thereby held approximately in a condition of labile equilibrium.

7. A grinding machine according to claim 3; further comprising a motor for driving said cup-shaped grinding wheel; and wherein the housing of said motor constitutes said sleeve, and the shaft of said motor constitutes said spindle.

References Cited in the file of this patent

UNITED STATES PATENTS

| | | |
|---|---|---|
| 70,393 | Benton | Nov. 5, 1867 |
| 238,366 | Doane | Mar. 1, 1881 |
| 1,418,863 | Ballou | June 6, 1922 |
| 1,571,346 | Schramm | Feb. 2, 1926 |
| 1,659,226 | Wildhaber | Feb. 14, 1928 |
| 1,788,737 | Olson | Jan. 13, 1931 |
| 1,789,544 | De Vlieg | Jan. 20, 1931 |
| 1,800,307 | Marschke et al. | Apr. 14, 1931 |
| 2,320,130 | Harris | May 25, 1943 |